(12) United States Patent
Kotlarski et al.

(10) Patent No.: US 6,279,191 B1
(45) Date of Patent: *Aug. 28, 2001

(54) WIPER BLADE FOR CLEANING VEHICLE GLASS PANES

(75) Inventors: Thomas Kotlarski, Buehlertal; Karlheinz Lorenz, Baden-Baden, both of (DE)

(73) Assignee: Robert Bosch GmbH, Stuttgart (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,869
(22) PCT Filed: Jun. 30, 1998
(86) PCT No.: PCT/DE98/01787
  § 371 Date: Feb. 25, 1999
  § 102(e) Date: Feb. 25, 1999
(87) PCT Pub. No.: WO99/02383
  PCT Pub. Date: Jan. 21, 1999

(30) Foreign Application Priority Data

Jul. 11, 1997 (DE) .............................. 197 29 864

(51) Int. Cl.[7] ................ B60S 1/38; B60S 1/40
(52) U.S. Cl. ............... 15/250.201; 15/250.43; 15/250.32; 15/250.451
(58) Field of Search .............. 15/250.43, 250.451, 15/250.452, 250.453, 250.454, 250.44, 250.32, 250.201

(56) References Cited

U.S. PATENT DOCUMENTS

| | | | |
|---|---|---|---|
| 3,093,856 | * | 6/1963 | Smithers . |
| 3,116,507 | * | 1/1964 | Scinta . |
| 3,192,551 | * | 7/1965 | Appel ............................. 15/250.43 |
| 3,390,416 | * | 7/1968 | Scinta ............................. 15/250.32 |
| 3,408,678 | * | 11/1968 | Linker ............................. 15/250.32 |
| 3,430,285 | * | 3/1969 | Rickett . |
| 4,348,782 | * | 9/1982 | Fournier ......................... 15/250.32 |

FOREIGN PATENT DOCUMENTS

| | | | |
|---|---|---|---|
| 1028896 | * | 4/1958 | (DE) . |
| 1 505 397 | | 10/1969 | (DE) . |
| 316114 | * | 5/1989 | (EP) . |
| 1239780 | * | 7/1960 | (FR) ............................... 15/250.453 |
| 2222853 | * | 10/1974 | (FR) . |
| 2222855 | * | 10/1974 | (FR) . |

* cited by examiner

Primary Examiner—Gary K. Graham
(74) Attorney, Agent, or Firm—Michael J. Striker

(57) ABSTRACT

A wiper blade (10) is proposed, which serves to clean vehicle windows. The wiper blade has an elongated, strip-like spring-elastic support element (12), against one band face (48) of which, facing away from the window, a connection device (16) that can be connected to a driven wiper arm (18) is held, and against whose other band face (46), facing toward the window, an elongated, rubber-elastic wiper strip (14) is disposed parallel to the longitudinal axis, wherein the multi-part support element (12) has two spring rails (30, 32), disposed in longitudinal grooves (38, 40) facing one another of the wiper strip (14), which rails are secured in the longitudinal grooves by at least one holder fitting over their longitudinal edges remote from one another. Simplified and thus economical assembly with improved wiping performance is assured if the holder (34 or 36) is divided in the longitudinal direction of the wiper blade (10) into holder parts (33, 35), and if further the holder parts (33, 35) are joined together.

14 Claims, 4 Drawing Sheets

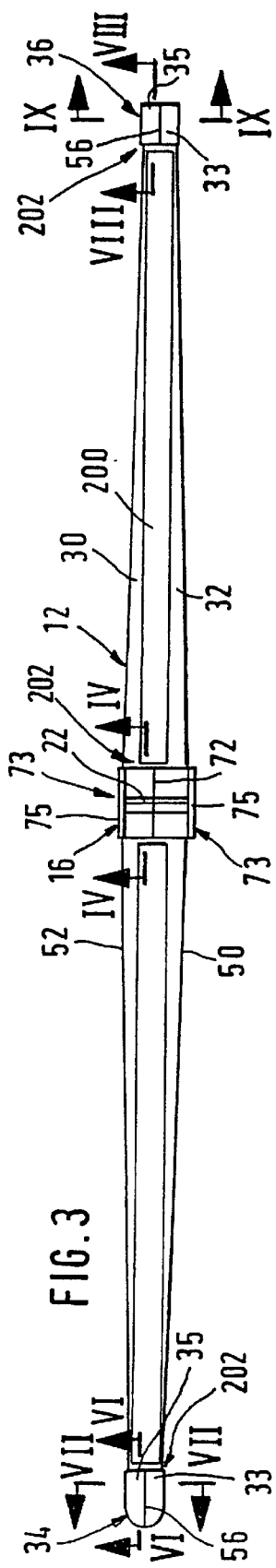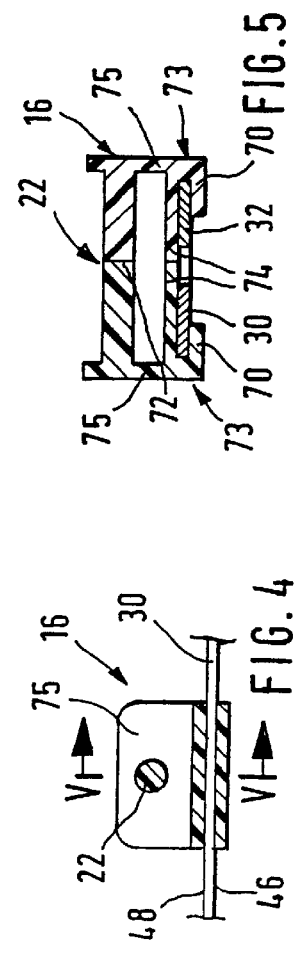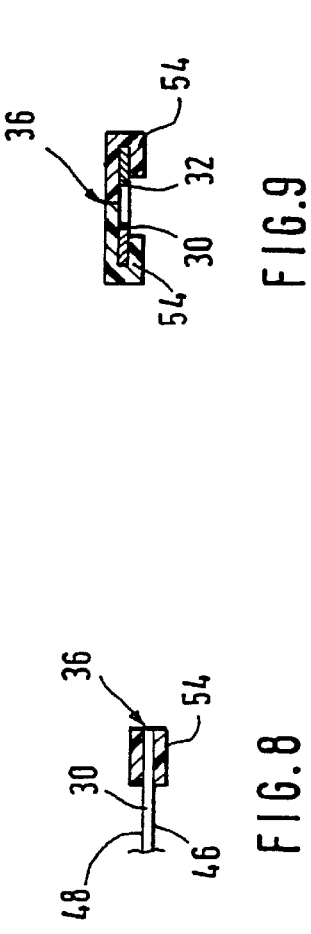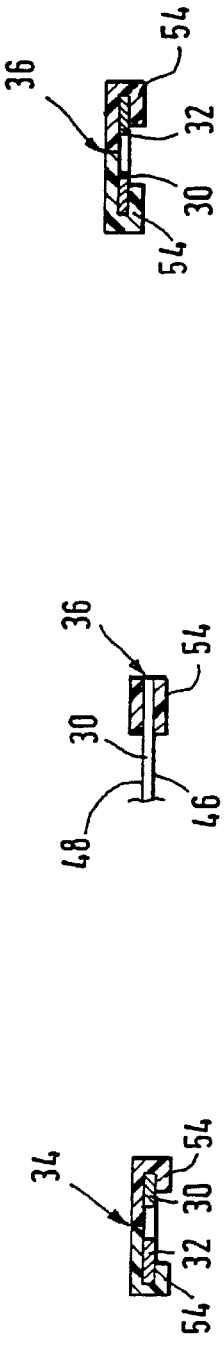

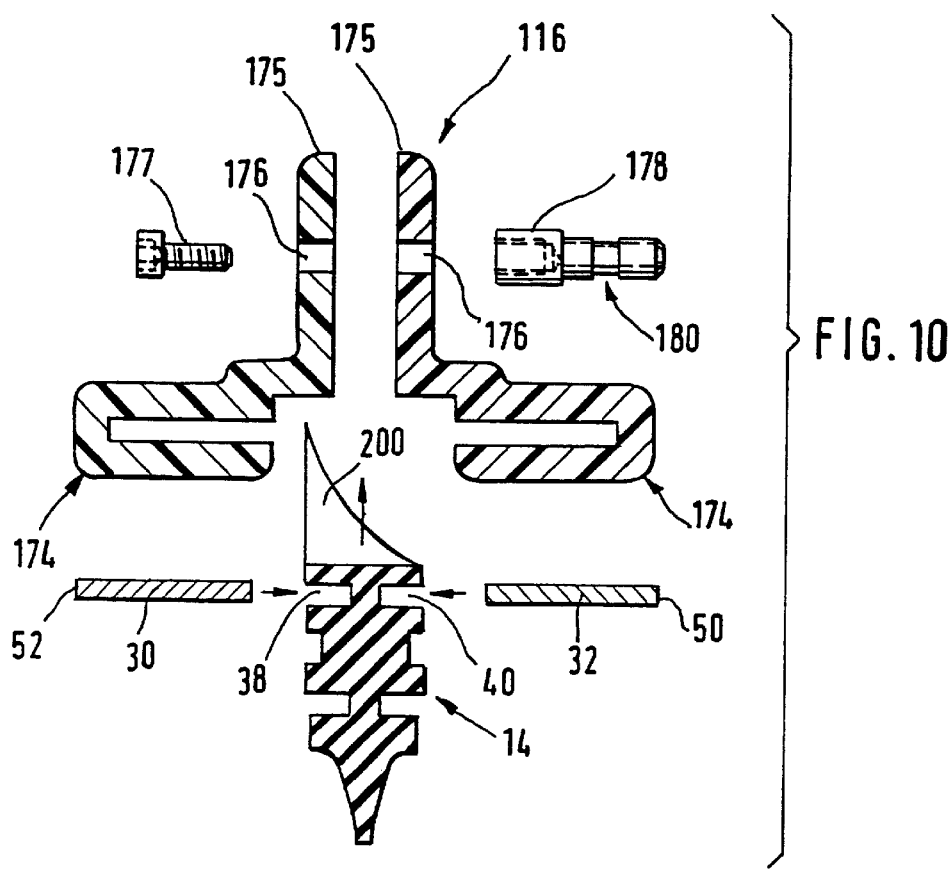
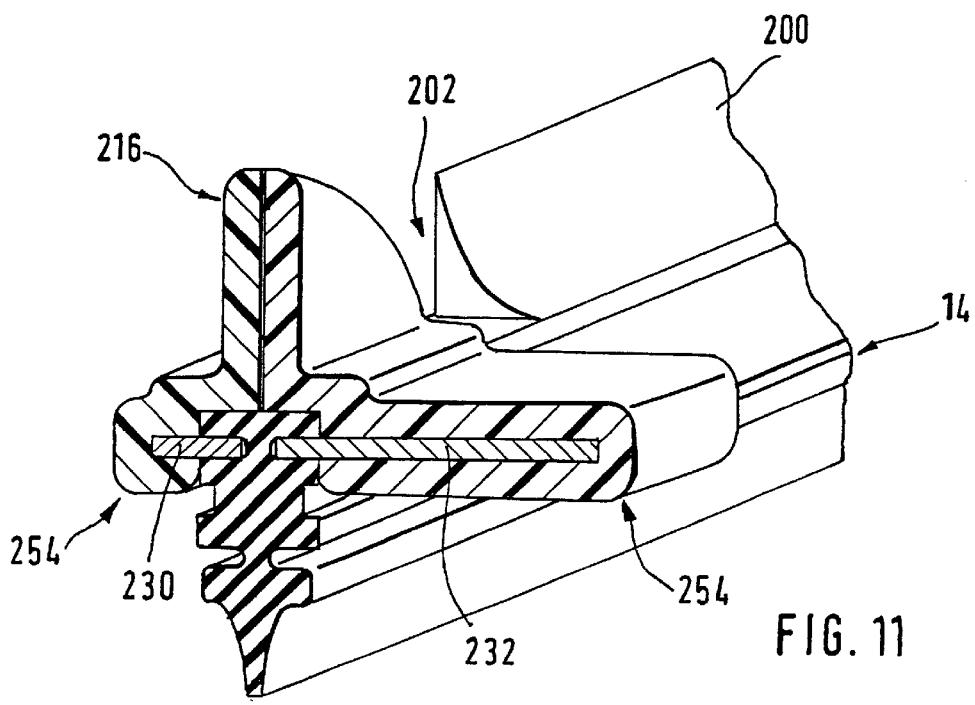

WIPER BLADE FOR CLEANING VEHICLE GLASS PANES

BACKGROUND OF THE INVENTION

The present invention relates to a wiper blade for cleaning vehicle windows.

In wiper blades the support element is intended to assure the most uniform possible distribution of the wiper blade contact pressure, originating in the wiper arm, on the window over the entire field swept by the wiper blade.

By means of a suitable curvature of the unstressed support element—that is, when the wiper blade is not resting on the window—the ends of the wiper strip placed completely against the window while the wiper blade is in operation are stressed by the support element, which is then tensed toward the window even if the radii of curvature of spherically curved vehicle windows change for every wiper blade position. The curvature of the wiper blade must accordingly be somewhat greater than the greatest curvature measured in the wiping field of the window to be wiped. The support element thus replaces the complicated support bracket construction with two spring rails disposed in the wiper strip, of the kind employed in conventional wiper blades (German Published, Non-Examined Patent Application DE-OS 15 05 397).

In a known wiper blade of this type (German Patent 10 28 896), the two spring rails, designated as longitudinal springs and belonging to the support element, are secured by one-piece spring clamps in the longitudinal grooves, designated as slits, in the rubber wiper strip. The clamps must be thrust onto the longitudinal springs in the longitudinal direction of the wiper blade, embracing the outer edges of the springs with claws. A rib connecting the claws must be curved to suit the thickness of the spine of the wiper strip, which leads to unfavorable assembly conditions. A middle clamp, disposed in the region of the connection device, must in fact cross this device in an aperture, which entails considerable expense for assembly, since at least one of the two claws cannot be formed until after that.

SUMMARY OF THE INVENTION

In accordance with the present invention in a wiper blade a holder is divided in a longitudinal direction of the wiper blade into holder parts, and the holder parts are joined together.

In the wiper blade of the invention, it is possible for the finished holder parts to be brought to the wiper blade crosswise to the longitudinal length of the support element and thus also of the wiper blade and then joined together. This kind of assembly is especially economical, because it can be performed as needed by assembly robots.

To improve the wiping performance and quality, a plurality of holders are expediently distributed over the longitudinal length of the support element and spaced apart from one another.

With relatively short wiper blades, it can suffice for that purpose to dispose one holder on each end portion of the elongated support element.

If the connection device is provided with fastening means that engage the two spring rails; and the connection device is divided in the longitudinal direction of the support element; and the device parts are joined together in their final assembled position, then efficient assembly on the support element for the connection device is obtained as well.

The design of a wiper blade that is highly effective, even at high vehicle speeds, is especially advantageous if the region of the wiper strip located on the band face remote from the window is embodied as a wind deflector strip extending essentially away from the window, and each holder is assigned one recess in the wind deflector strip.

With regard to the structural height of the wiper blade, it may be favorable if the connection device is assigned a recess in the wind deflector strip. Along with simple assembly, reliable securing of the spring rails in the longitudinal grooves of the wiper strip is attained if the holder parts, in clamplike fashion, grip an exposed portion of the outer edges of the spring rails.

This embodiment is advantageous, with the same advantages, for the disposition of the connection device as well. Moreover, the installed connection device can contribute to seating the spring rails, as prescribed, in their middle portion in the longitudinal grooves.

An especially simple, stable and easily installed connection device is obtained if the connection device has two device parts, and each device part has a flangelike protrusion, extending into the longitudinal direction of the support element and standing upright on the window and extending away from it, on which protrusion connection means for the wiper arm are seated.

Further simplifications in assembly both for the holders and for the connection device are obtained if the holder parts and/or the connection devices can be interlocked with one another.

Further advantageous refinements and features of the invention are disclosed in the ensuing description of exemplary embodiments shown in the associated drawing.

BRIEF DESCRIPTION OF THE DRAWING

Shown in the drawing are:

FIG. 3, a plan view on the wiper blade of FIG. 1;

FIG. 4, a fragmentary section taken along the line IV—IV through the support element, provided with a connection device, of the wiper blade of FIG. 3;

FIG. 5, a section taken along the line V—V through the arrangement of FIG. 4;

FIG. 6, a fragmentary section taken along the line VI—VI through the support element of the wiper blade of FIG. 3;

FIG. 7, a section taken along the line VII—VII through the support element of FIG. 3, rotated by 90°;

FIG. 8, a fragmentary section taken along the line VIII—VIII through the support element of the wiper blade of FIG. 3;

FIG. 9, a section taken along the line IX—IX through the support element of FIG. 3, rotated by 90°;

FIG. 10, a section through FIG. 5 through a wiper blade equipped with a different connection device, with the parts of the wiper blade and the connection device shown in the position prior to assembly;

FIG. 11, an arrangement according to FIG. 10 for a differently embodied wiper blade, with the parts of the wiper blade and connection device shown in their operating position;

DESCRIPTION OF THE PREFERRED EMBODIMENT

Figure 1:
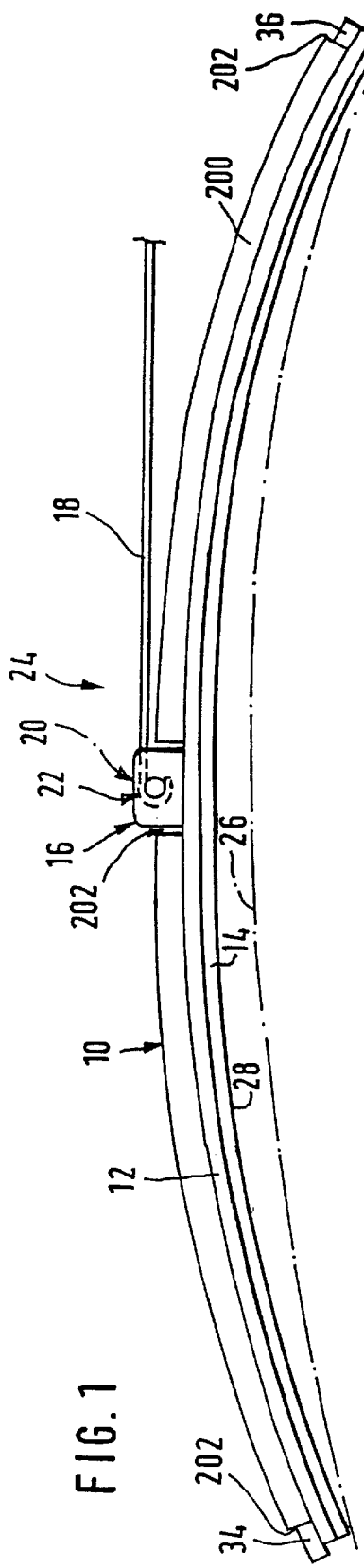
FIG. 1, a side view of a wiper blade according to the invention.
Figure 2:
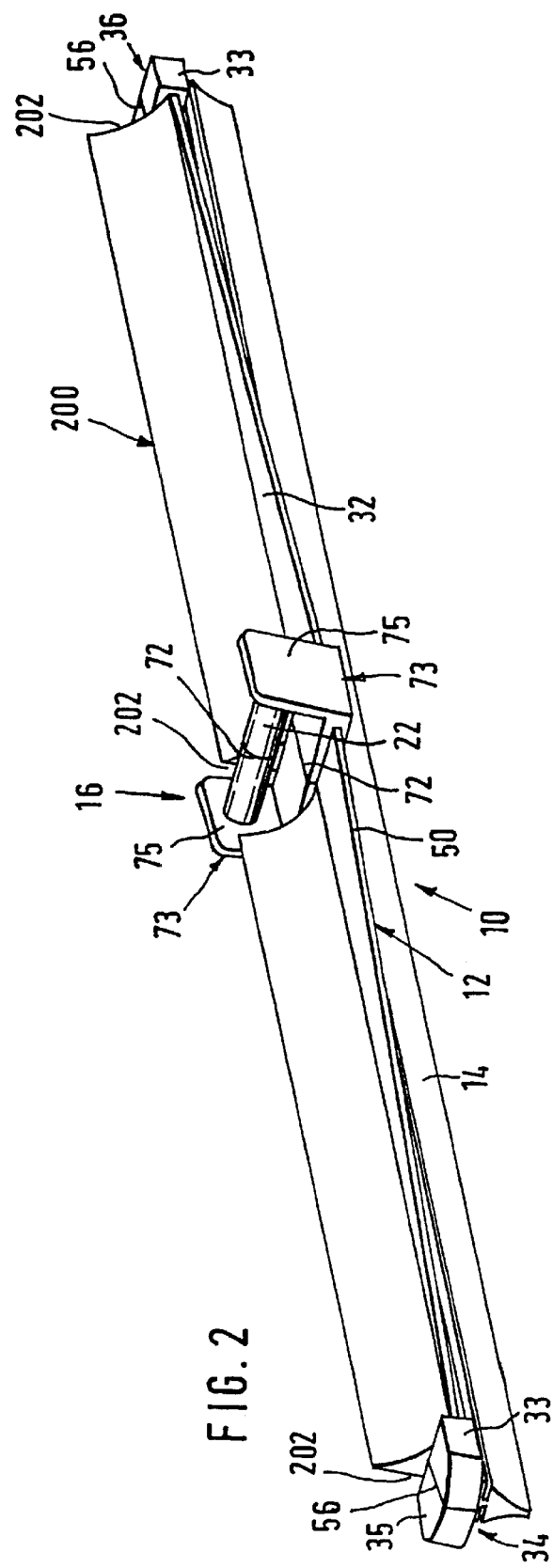
FIG. 2, a perspective view of the wiper blade of FIG. 1, not to scale.
Figure 13:
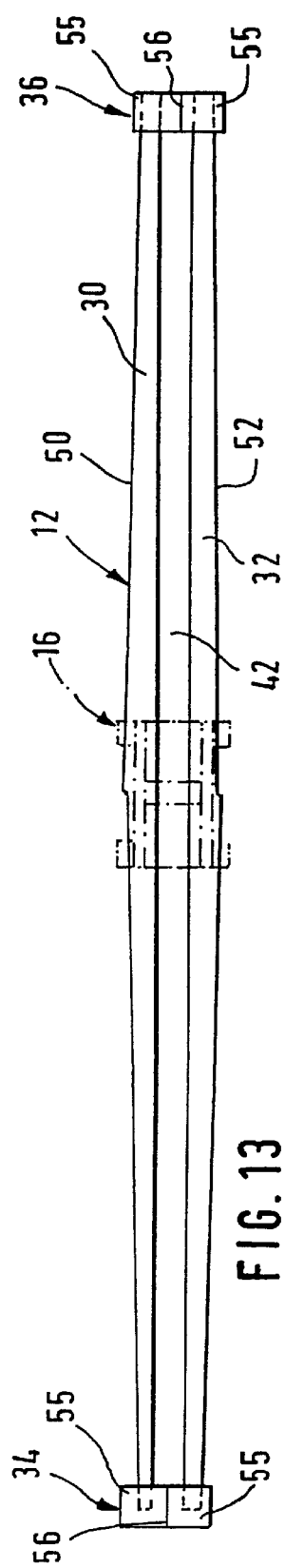
FIG. 13, a plan view on a support element of the wiper blade of FIG. 2.

A wiper blade 10 shown in FIGS. 1–3 has a multipart, elongated, spring-elastic support element 12, which is shown separately in FIG. 13. On the top side of the support element, facing away from the window to be wiped, a connection device 16 is provided, with the aid of which the wiper blade 10 can be separably joined to a driven wiper arm 18 guided in the body of a motor vehicle. On the underside of the support element 12, facing toward the window, an elongated, rubber-elastic wiper strip 14 is disposed, parallel to the longitudinal axis. On the free end 20 of the wiper arm 18, a hook acting as a counterpart connection means is formed on; it grips a pivot pin 22 that belongs to the connection device 16 of the wiper blade 10. Securing between the wiper arm 18 and the wiper blade 10 is performed by securing means, not shown in further detail but known per se and embodied as an adapter. The wiper arm 18 and thus also the hook on the end 20 of the arm is urged in the direction of the arrow 24 toward the window to be wiped, whose surface to be wiped is suggested in FIG. 1 by a dot-dashed line 26. Since the dot-dashed line 26 is intended to represent the greatest curvature of the window surface, it is clear that the curvature of the wiper blade 10, which contacts the window with its two ends, is greater than the maximum curvature of the window. Under the contact pressure (arrow 24), the wiper blade presses with its wiper lip 28 over its entire length against the window surface 26. In the process, a tension builds up in the striplike spring-elastic support element 12, and this tension assures proper contact of the wiper strip 14 or wiper lip 28, over its entire length, with the motor vehicle window.

Figure 12:
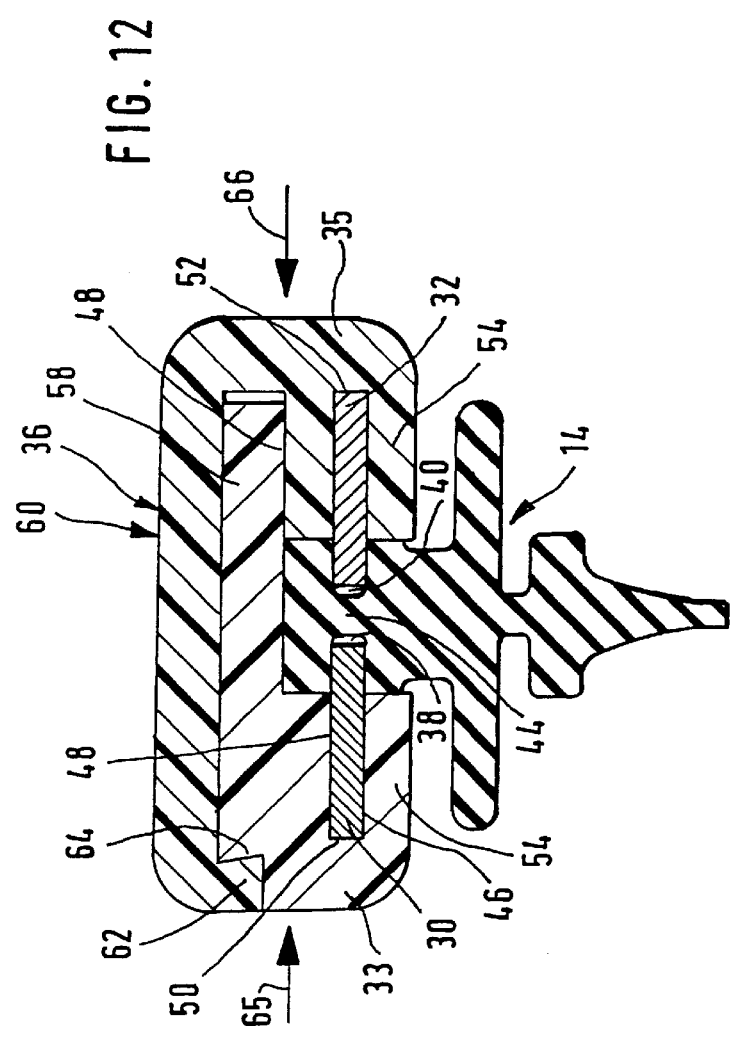
FIG. 12, a section as in FIG. 9 through a wiper blade in the region of a holder for the spring rails, the two parts of which are interlocked with one another, on a larger scale.

The particular design of the wiper blade of the invention will now be described in further detail. In FIG. 13, the support element 12 is shown separately. It is clear from this that the support element 12 has two spring rails 30 and 32, which are spaced apart from one another. Besides the two spring rails 30 and 32, the support element 12 in the embodiment of FIGS. 1–3 and 13 also includes holders 34 and 36, whose purpose will be explained later. It is also suggested in FIG. 13 that the connection device 16, shown in dot-dashed lines there, is seated in the middle region of the support element 12. The disposition and fastening of the connection device 16 to the support element 12, or to its spring rails 30 and 32, can best be seen from FIGS. 4 and 6. FIG. 12 in particular shows the disposition of the support element parts (spring rails 30 and 32) with respect to the wiper strip 14. In conjunction with FIGS. 2 and 3, it can be seen that the spring rails 30 and 32 rest in two opposed longitudinal grooves 38 and 40 of the wiper strip 14, which are located in the same plane and between which a longitudinal slit 42 remains in the support element 12 (FIG. 13). Extending through this longitudinal slit 42 is a riblike constriction 44 of the wiper strip 14. It can also be seen from FIGS. 12 and 13 that the support element 12 has two band faces, of which one band face 46 faces toward the window to be wiped, while the other band face 48 points away from window. It can also be seen that at least in some portions, the two spring rails 30 and 32 protrude out of the longitudinal grooves 38, 40 of the wiper strip 14 with their longitudinal edges 50 and 52 pointing away from one another. To secure the two spring rails 30 and 32 in their longitudinal grooves 38 and 40, two holders are used in this exemplary embodiment, of which one is located on each end portion of the spring rails 30 and 32. The two holders 38, 40 are thus spaced apart. The holders themselves extend crosswise to the longitudinal length of the wiper blade 10 and grip the outer longitudinal edges 50 and 52, which are remote from one another, of the two spring rails 30 and 32 with clawlike protrusions 54. It can also be seen that the holders 34 and 36 are divided longitudinally of the wiper blade 10, which is suggested in FIGS. 2, 3 and 13 by a longitudinal seam 50. In actual practice, however, this longitudinal seam 56 will not necessarily be embodied as shown in FIGS. 2, 3 and 13. In order for the holders to perform their securing function with regard to the spring rails 30 and 32, the holder parts 33 and 35, formed by the parting seam 56, must be firmly joined together after assembly. This can be done for instance by welding, adhesive bonding, or some similar production or assembly technique, regardless of whether the holders are made from a plastic or from metal.

One of a plurality of suitable ways in practice to join the two holder parts 33 and 35 to one another will now be explained in conjunction with FIG. 12. It can be seen there that the holder parts 33 and 35 of the holder 36 are seated with clawlike protrusions 54 on their spring rails 30 and 32, respectively. Their placement is made such that the protrusions 54 grip the outer edges 50, 52 of the spring rails in an exposed portion of the spring rails 30, 32. The holder part 33 grips the wiper strip 14 with a protrusion 58 oriented crosswise to the longitudinal length of the wiper blade. A U-shaped extension 60 of the holder part 35 in turn fits over the protrusion 58 of the holder part 33. The free end portion of the U-shaped extension 60 located on the side of the holder part 33 fits with its suitably embodied leg 62 of the U under an undercut 64 of the holder part 33, so that an unintended separation of the holder parts 33 and 35 from one another is not possible. To mount the two holder parts, that is, to put them in the designated operating position, they must be pressed against one another in the direction of the two arrows 65 and 66, which can be done by utilizing the elasticity of the wiper strip 14. Once the interlocking has been effected in accordance with FIG. 12, the two holder parts 33 and 35 are seated with a residual tension of the wiper strip 14 in their prescribed position as shown in FIG. 12. The holders may for instance be embodied according to FIG. 5, where with a caplike end wall 68 they cover the end edges of the spring rails 30 and 32. As a result, a lessening in the risk of injury from the sharp end edges of the spring rails 30, 32 is achieved. Moreover, by means of these caplike end holders 34, the risk of damage to the vehicle paint or to the wiper blade itself can be reduced. However, it is also possible to embody the holders as shown in FIG. 8, where this end wall is missing and the holder 36 is flush with the end edges of the spring rails 30, 32. The connection device 16 has a design similar to the holders 34 and 36. As FIG. 2, 3 and 5 show, the connection device is also divided in the longitudinal direction of the wiper blade. This is represented by a seam line 72. This seam line 72 extends through both a plate part 74 (FIG. 5), which contacts the support element 12 and grips the spring rails 30 and 32 with its claws 70, and the pivot pin 22. The claws 70 thus form fastening means for retaining the connection device 16 on the support element 12. In an embodiment of the connection device shown in FIGS. 2–5, this device has flangelike walls 75, which are disposed on the plate part 74 and are spaced apart from one another and on each of which half of the also divided pivot pin 22 is disposed. The flangelike walls 75 belong to two device or base parts 73, which can be joined together along the seam line 72 and of which each has a flangelike protrusion (wall 75), extending longitudinally of the support element and standing upright from the window and extending away from it, on which protrusion the connection means for the wiper arm 18, which are formed by the pivot pin 22, are seated. The two parts 73 of the connection device 16, with their claws 70, grip an exposed middle portion of the outer edges of the spring rails in clamplike fashion. Just as has already been explained for the holders 34 and 36, the two device parts 73 of the connection device 16 can be joined together by means not shown in further detail. Interlocking of the two device parts with one another is just as conceivable as welding or adhesive bonding, for instance.

Another design of a connection device 116 can be seen from FIG. 10. There, flangelike protrusions 175 are again provided on the two base parts 174, extending longitudinally of the support element and standing relative to the window and extending away from it, but these protrusions can be joined together in direct contact with one another. In addition, in this embodiment as well, the base parts 174 grip the outer longitudinal edges of the spring rails 30 and 32 with clawlike protrusions 154, as has already been described for the preceding exemplary embodiment of the connection device 16. The fastening of these two base parts 174 can be achieved by a screw connection. To that end, the two protrusions 175 each have a bore 176, and in the installed state of the connection device 116 these bores are aligned with one another. A screw 177 passes through the protrusions 175 through the bores 176 and cooperates with a nut part 178 of a pivot pin 180, on which in a manner known per se the suitably designed free end of a wiper arm can be connected. However, it is also conceivable—in a manner known per se—to join the pivot pin fixedly to the wiper arm and to secure the pin receptacle, belonging to it, to the protrusions 175. Then at the same time a fixed connection of the two base parts 174 can be realized.

A further embodiment, highly similar to the embodiment of FIG. 10, is shown in FIG. 11. The essential difference from the embodiment of FIG. 10 is that the two spring rails 230 and 232 are of unequal width. A corresponding embodiment therefore also has the clawlike protrusions 254 of this further connection device 217.

A special feature of the wiper blade of the invention will now also be explained in conjunction with FIGS. 1–3 and 11. As can be seen from these drawings, the wiper strip 14, on the band face 48 of the support element 12 remote from the window, has an extension, which is embodied as a wind deflector strip 200 extending essentially away from the window. So that in a wiper blade embodied in this way it is possible to place the holders 34, 36 and also the connection device 16 appropriately, recesses are assigned to these parts in the wind deflector strip 200.

A common feature of all the exemplary embodiments of the holders 34, 36 is that in a wiper blade of this type the holders are divided longitudinally of the wiper blade, and that the holder parts 33, 35 are joined to one another.

A corresponding embodiment is also provided for the various connection devices 16, 116 and 216 described.

What is claimed is:

1. A wiper blade for cleaning vehicle windows, comprising an elongated, strip-shaped spring-elastic support element; a connection device connectable to a driven wiper arm and held against one band face of said support element; an elongated, rubber-elastic wiper strip disposed parallel to a longitudinal axis against another band face of said support element, said support element being formed as a multi-part support element and having two spring rails disposed in longitudinal grooves facing one another of the wiper strip; at least one holder securing said rails in said longitudinal grooves and fittable over longitudinal edges of said rails remote from one another, said holder being divided in a longitudinal direction of the wiper blade into holder parts which are joined together defining a longitudinally extending central seam line.

2. A wiper blade as defined in claim 1, wherein a plurality of holders are distributed over a longitudinal length of said support element and spaced apart from one another.

3. A wiper blade as defined in claim 2, wherein one of the holders is disposed at least on each end portion on said support element.

4. A wiper blade as defined in claim 1, wherein said holder parts grip in a clamping fashion an exposed portion of outer edges of said spring rails.

5. A wiper blade as defined in claim 1, wherein parts of said connection device grip in a clamping fashion an exposed middle portion of outer edges of said spring rails.

6. A wiper blade as defined in claim 1, wherein said holder parts are interlockable with one another.

7. A wiper blade as defined in claim 1, wherein said connection device is provided with fastening means which engage said spring rails.

8. A wiper blade for cleaning vehicle windows, comprising an elongated, strip-shaped spring-elastic support element; a connection device connectable to a driven wiper arm and held against one band face of said support element; an elongated, rubber-elastic wiper strip disposed parallel to a longitudinal axis against another band face of said support element, said support element being formed as a multi-part support element and having two spring rails disposed in longitudinal grooves facing one another of the wiper strip; at least one holder securing said rails in said longitudinal grooves and fittable over longitudinal edges of said rails remote from one another, said holder being divided in a longitudinal direction of the wiper blade into holder parts which are joined together defining a longitudinally extending central seam line, said connection device being divided in a longitudinal direction of said support part into device parts, said device parts being joined together.

9. A wiper blade as defined in claim 8, wherein said device parts are interlocked with one another.

10. A wiper blade for cleaning vehicle windows, comprising an elongated, strip-shaped spring-elastic support element; a connection device connectable to a driven wiper arm and held against one band face of said support element; an elongated, rubber-elastic wiper strip disposable parallel to a longitudinal axis against another band face of said support element, said support element being formed as a multi-part support element and having two spring rails disposed in longitudinal grooves facing one another of the wiper strip; at least one holder securing said rails in the longitudinal grooves and fittable over longitudinal edges of said rails remote from one another, said holder being divided in a longitudinal direction of the wiper blade into holder parts which are joined together; and a wind deflector strip which is located in a region of said wiper strip on said one band face, said wind deflector strip being provided with one recess assigned for each holder.

11. A wiper blade as defined in claim 10, wherein said wind deflector strip has a recess assigned to said connection device.

12. A wiper blade for cleaning vehicle windows, comprising a driven wiper arm; an elongated, strip-shaped spring-elastic support element; a connection device connected to said driven wiper arm and held against one band face of said support element; an elongated, rubber-elastic wiper strip disposed parallel to a longitudinal axis against another band face of said support element, said support element being formed as a multi-part support element and having two spring rails disposed in longitudinal grooves facing one another of said wiper strip; at least one holder securing said rails in said longitudinal grooves and fittable over longitudinal edges of said rails remote from one another, said holder being divided in a longitudinal direction of the wiper blade into holder parts which are joined together defining a longitudinally extending central seam line.

13. A wiper blade for cleaning vehicle windows, comprising a driven wiper arm; an elongated, strip-shaped spring-elastic support element; a connection device connected to said driven wiper arm and held against one band face of said support element; an elongated, rubber-elastic wiper strip disposed parallel to a longitudinal axis against another band face of said support element, said support element being formed as a multi-part support element and having two spring rails disposed in longitudinal grooves facing one another of said wiper strip; at least one holder securing said rails in said longitudinal grooves and fittable over longitudinal edges of said rails remote from one another, said holder being divided in a longitudinal direction of the wiper blade into holder parts which are joined together defining a longitudinally extending central seam line, said connection device being divided in a longitudinal direction of said support part into device parts, said device parts being joined together.

14. A wiper blade for cleaning vehicle windows, comprising a driven wiper arm; an elongated, strip-shaped spring-elastic support element; a connection device connected to said driven wiper arm and held against one band face of said support element; an elongated, rubber-elastic wiper strip disposed parallel to a longitudinal axis against another band face of said support element, said support element being formed as a multi-part support element and having two spring rails disposed in longitudinal grooves facing one another of said wiper strip; at least one holder securing said rails in said longitudinal grooves and fittable over longitudinal edges of said rails remote from one another, said holder being divided in a longitudinal direction of the wiper blade into holder parts which are joined together; and a wind deflector strip which is located in a region of said wiper strip on said one band face, said wind deflector strip being provided with one recess assigned for each holder.

* * * * *